(12) United States Patent
Kim et al.

(10) Patent No.: US 12,327,139 B2
(45) Date of Patent: Jun. 10, 2025

(54) APPARATUS FOR ACCELERATING NEURAL NETWORKS

(71) Applicant: University Industry Foundation, Yonsei University, Seoul (KR)

(72) Inventors: Youngsok Kim, Seoul (KR); Jinho Lee, Seoul (KR); Mingi Yoo, Seoul (KR); Jaeyong Song, Seoul (KR); Jounghoo Lee, Seoul (KR)

(73) Assignee: UNIVERSITY INDUSTRY FOUNDATION, YONSEI UNIVERSITY, Seoul (KR)

( * ) Notice: Subject to any disclaimer, the term of this patent is extended or adjusted under 35 U.S.C. 154(b) by 100 days.

(21) Appl. No.: 18/373,682

(22) Filed: Sep. 27, 2023

(65) Prior Publication Data

US 2024/0419494 A1 Dec. 19, 2024

(30) Foreign Application Priority Data

Jun. 13, 2023 (KR) .................. 10-2023-0075615

(51) Int. Cl.
*G06F 9/50* (2006.01)
*G06F 15/80* (2006.01)

(52) U.S. Cl.
CPC ........ *G06F 9/5027* (2013.01); *G06F 15/8007* (2013.01); *G06F 15/8046* (2013.01)

(58) Field of Classification Search
None
See application file for complete search history.

(56) References Cited

U.S. PATENT DOCUMENTS

| | | | |
|---|---|---|---|
| 2018/0276535 A1* | 9/2018 | Mohamed | G06N 3/047 |
| 2020/0142948 A1* | 5/2020 | Yang | G06F 40/216 |
| 2021/0287067 A1* | 9/2021 | Zavoronkovs | G06N 3/044 |
| 2021/0357651 A1* | 11/2021 | Fan | G06N 3/045 |
| 2022/0188613 A1* | 6/2022 | Li | G06F 7/5443 |
| 2022/0214861 A1* | 7/2022 | Sohrabizadeh | G06F 9/3001 |
| 2022/0343146 A1* | 10/2022 | Xue | G06N 3/0442 |

FOREIGN PATENT DOCUMENTS

KR  10-2018-0123846 A  11/2018

OTHER PUBLICATIONS

Yan, M., et al., HyGCN: A GCN Accelerator with Hybrid Architecture, 2020, IEEE, pp. 15-29. (Year: 2020).*
Nair, G.R. et al., FPGA Acceleration of GCN in Light of Symmetry of Graph Adjacency Matrix, Jun. 2, 2023, IEEE, 10 pages. (Year: 2023).*

(Continued)

*Primary Examiner* — Eric Coleman
(74) *Attorney, Agent, or Firm* — Paratus Law Group, PLLC

(57) ABSTRACT

An apparatus for accelerating neural networks, includes: a memory for storing graph input data including vertices and edges; an aggregation engine that processes the accumulation of features and generates feature vectors by taking the graph input data and performing an aggregation operation on the graph input data; an on-chip cache for caching the feature vectors; and a combination engine that generates a systolic array for matrix multiplications based on the feature vectors taken from the on-chip cache and weights taken from the memory.

11 Claims, 14 Drawing Sheets

(56) References Cited

OTHER PUBLICATIONS

Peltekis, C. et al., FusedGCN: A Systolic Three Matrix Multiplication Architecture for Graph Convolution Networks, 2022, IEEE, pp. 93-97. (Year: 2022).*

Li, J, et al., GCNAX: A Flexible and Energy-efficient Accelerator for Graph Convolution Neural Networks, 2021 IEEE, pp. 775-788. (Year: 2021).*

Zhang, B. et al., Hardware Acceleration of Large Scale GCN Inference, 2020, IEEE, pp. 61-68. (Year: 2020).*

Han, M. et al., HFGCN: High-speed and Fully-optimized GCN Accelerator, May 2023, IEEE, 12 pages. (Year: 2023).*

Tran, B. et al., Increasing the Efficiency of GPU Bitmap Index Query Processing, 2020, Springer Nature Switzerland, pp. 339-355. (Year: 2020).*

* cited by examiner

APPARATUS FOR ACCELERATING NEURAL NETWORKS

CROSS-REFERENCE TO PRIOR APPLICATION

This Application claims priority to Korean Patent Application No. 10-2023-0075615 (filed on Jun. 13, 2023), which is hereby incorporated by reference in its entirety.

ACKNOWLEDGEMENT

National Research Development Project Supporting the Present Invention

[Project Serial No.] 1711193986
[Project No.] 2020-0-01361-004
[Department] Ministry of Science and ICT
[Project Management (Professional) Institute] Institute of Information & communication Technology Planning & Evaluation
[Research Project Name] Information & Communication Broadcasting Research Development Project
[Research Task Name] Artificial Intelligence Graduate School Support Project (Yonsei University)
[Contribution Ratio] 1/2
[Project Performing Institute] University Industry Foundation, Yonsei University
[Research Period] 2023.01.01 to 2023.12.31

National Research Development Project Supporting the Present Invention

[Project Serial No.] 1711193187
[Project No.] 2021-0-00853-003
[Department] Ministry of Science and ICT
[Project Management (Professional) Institute] Institute of Information & communication Technology Planning & Evaluation
[Research Project Name] Development of Leading Technology for Advanced PIM Semiconductor
[Research Task Name] Project for Development of SW Platform for Utilizing PIM
[Contribution Ratio] 1/2
[Project Performing Institute] University Industry Foundation, Yonsei University
[Research Period] 2023.01.01 to 2023.12.31

BACKGROUND

The present disclosure relates to a technology for accelerating neural networks, and, more particularly, to an apparatus for accelerating neural networks capable of improving the speed of accelerating a GCN by exploiting compressed sparse features.

Graph convolutional networks (GCNs) are becoming increasingly popular as they overcome the limited applicability of prior neural networks. One recent trend in GCNs is the use of deep network architectures. Early accelerators of GCNs focused on using the high sparsity of the input graph topology to improve speed. It is known that the graph topology data exhibit near-100% sparsity. However, recent advances in the GCN are leading to different circumstances. With the introduction of residual connections, modern GCNs now have a larger number of layers, where the feature width remains constant throughout the entire network. With the deep modern GCNs, the intermediate feature sparsity sharply rises up to 70% as the network becomes deeper, compared to traditional shallow GCNs.

There are several key challenges, however, when it comes to fully exploiting the sparsity of the features for accelerating GCNs. First, a special format for the GCN intermediate features is required. Naively employing existing sparse formats such as compressed sparse row (CSR) for the features may result in lower performance. Second, existing sparse DNN accelerators are not a good fit for handling sparse features of GCNs. The objectives of DNN accelerators targeting convolutional neural networks (CNNs) are usually oriented toward reducing the computational workload. Such a strategy could be promising to CNNs because they are computationally intensive, and reducing the number of computations (i.e., MACs) easily translates to performance benefits. However, the computational complexity of GCNs is relatively low, because it usually involves only one MAC operation for each feature element. In such circumstances, the focus should be on reducing the memory traffic volume, not on reducing the amount of computation. Lastly, the varying level of sparsity makes it difficult to handle locality with tiling techniques. Recent work on GCN acceleration splits the graph topology as well as the feature matrix to reduce the feature working set to fit into cache memory. With such techniques, however, the dynamic level of sparsity cannot be estimated at a static time, and it is difficult to determine the right tile size.

RELATED ART LITERATURE

Korean Patent Application Publication No. 10-2018-0123846 (Nov. 20, 2018)

SUMMARY

The present disclosure is aimed at providing a technology for improving a compression rate by a compression format where bitmaps are as indices to exploit intermediate feature sparsity of a deep GCN, minimizing off-chip memory accesses, and handling a wide range of working set sizes.

According to an embodiment of the present disclosure, an apparatus for accelerating neural networks may include: a memory for storing graph input data including vertices and edges; an aggregation engine that processes the accumulation of features and generates feature vectors by taking the graph input data and performing an aggregation operation on the graph input data; an on-chip cache for caching the feature vectors; and a combination engine that generates a systolic array for matrix multiplications based on the feature vectors taken from the on-chip cache and weights taken from the memory.

The aggregation engine may be formed to have a plurality of processors each having a single instruction multiple data (SIMD) core structure.

The aggregation engine may include: a graph reader for extracting vertices and edges by taking the graph input data; a feature reader for generating feature vectors for the edges; and a sparse aggregator for receiving the vertices and the edges from the graph reader and receiving the feature vectors from the feature reader to perform the aggregation operation.

When the aggregation phase is performed first, the sparse aggregator may carry out the accumulation of the features by performing an operation between adjacency matrices and the feature vectors for the vertices and the edges, and may calculate weights by the combination engine.

When the combination phase is performed first, the sparse aggregator may calculate adjacency matrices for the vertices and the edges after performing an operation between the accumulation of the features and the weights by the combination engine.

The on-chip cache may operate as a buffer for exchanging data between the aggregation engine, the combination engine, and the memory.

The combination engine may perform a rectified linear unit (ReLU) operation on the systolic array and compress the result of the ReLU operation.

The combination engine may perform a bitmap-index embedded in-place CSR (BEICSR) format compression based on whether the result of the ReLU operation is zero or non-zero.

The combination engine may compress data row by row in the process of performing the BEICSR format compression and store each row in the same reserved place in the memory.

The combination engine may partition a bit vector for the entire row and embed it in the head of a corresponding unit slice, and may align slices to burst boundaries and perform the BEICSR format compression for each slice to allocate a memory space for holding slices densely.

The combination engine may update the memory by storing the result of the BEICSR format compression in the on-chip cache.

According to an embodiment of the present disclosure, an apparatus for accelerating neural networks may include: a memory for storing graph input data including vertices and edges; an aggregation engine that processes the accumulation of features and generates feature vectors by taking the graph input data and performing an aggregation operation on the graph input data; and a combination engine that generates a systolic array for matrix multiplications based on the feature vectors and weights taken from the memory.

The aggregation engine performs the aggregation operation by taking the graph input data to extract vertices and edges and generating feature vectors for the edges.

The combination engine may perform a rectified linear unit (ReLU) operation on the systolic array and carry out a bitmap-index embedded in-place CSR (BEICSR) format compression based on the result of the ReLU operation.

The disclosed art may have the following effects. However, because it does not mean that a specific embodiment must include all of the following effects or only include the following effects, the scope of the disclosed art should not be deemed to be limited thereto.

An apparatus for accelerating neural networks according to an embodiment of the present disclosure may be capable of exploiting sparsity of intermediate features when performing a deep GCN and of enhancing working speed and energy efficiency by processing various working set sizes induced by dynamic levels of sparsity.

DETAILED DESCRIPTION

Figure 1:
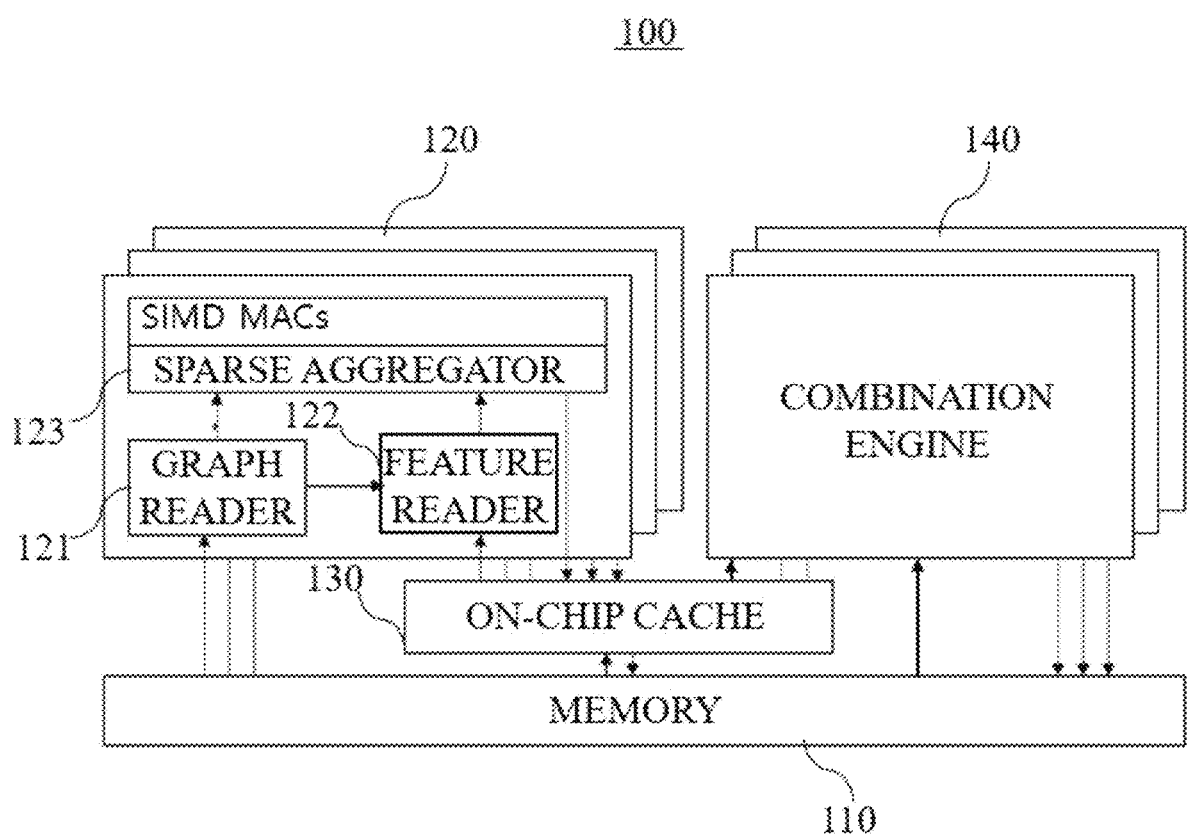
FIG. 1 shows an apparatus for accelerating neural networks according to the present disclosure.

Because the description of the present disclosure is merely aimed at showing embodiments for structural or functional description, the scope of the present disclosure should not be deemed to be limited by the embodiments in the description. That is, since the embodiments may be variously modified and may have various forms, it should be understood that the scope of the present disclosure includes equivalents for realizing the technology. In addition, because it is not meant that a specific embodiment must include all of the objects or the effects presented in the present disclosure or only those effects, the scope of this disclosure should not be deemed to be limited thereto.

Meanwhile, the meaning of terms described in the present disclosure should be understood as follows.

Terms such as "first" and "second" are used to distinguish one component from another, and the scope of the present disclosure should not be limited by these terms. For example, a first component may be termed a second component, and, similarly, the second component may be termed the first component.

When a component is referred to as being "connected" to another component, it means that the component may be directly connected to the other component or there may be other components therebetween. On the other hand, when a component is referred to as being "directly connected" to another component, it means that there are no other components therebetween. Meanwhile, other expressions describing the relationship between components, such as "between" and "right between" or "adjacent to" and "directly adjacent to," should be interpreted in the same manner.

Expressions in the singular form include the meaning of the plural form unless they clearly mean otherwise in the context. In addition, expressions such as "comprise" or "have" are used to indicate the presence of an embodied feature, a number, a step, an operation, a component, a part, or a combination thereof, and are not used to exclude the possibility of the presence or the addition of one or more other features, numbers, steps, operations, components, parts, or combinations thereof.

An identification code (e.g., a, b, c, etc.) of each step is used for convenience of description and not for indicating an order in which the steps are taken, and, unless the context clearly indicates a specific order, the steps may be taken in another order. That is, the steps may be taken in the specific order, may be taken substantially at the same time, or may be taken in a reverse order. The present disclosure can be implemented as computer-readable code on computer-readable recording media, and examples of the computer-readable recording media include all types of recording devices in which data that can be read by a computer system is stored. Examples of the computer-readable recording media include ROM, RAM, CD-ROM, a magnetic tape, a floppy disk, an optical data storage device, etc. In addition, the computer-readable recording media may be distributed to computer systems connected through a network, so that computer-readable codes may be stored and executed in a distributed manner.

All terms used herein have meanings commonly known to a person having ordinary skill in the field to which the present disclosure belongs, unless otherwise defined. Terms whose meanings are defined in commonly used dictionaries have meanings in the context of related technologies, and do not have ideal or overly formal meanings unless explicitly defined in the present disclosure.

FIG. 1 shows an apparatus for accelerating neural networks according to the present disclosure.

Referring to FIG. 1, an apparatus 100 for accelerating neural networks may include a memory 110, an aggregation engine 120, an on-chip cache 130, and a combination engine 140.

The memory 110 may store graph input data including vertices and edges. Here, the memory 110 may correspond to off-chip DRAM, but is not necessarily limited thereto.

The aggregation engine 120 may process the accumulation of features and generate feature vectors by taking graph input data and performing an aggregation operation on the graph input data. Here, the aggregation engine 120 may be formed to have a plurality of processors each having a single instruction multiple data (SIMD) core structure. The aggregation engine 120 may process the accumulation of features at various points by using the processor having the SIMD core structure, and may continuously process the aggregation without being stalled. The aggregation engine 120 may perform an aggregation operation by taking graph input data, extracting vertices and edges, and generating feature vectors for the edges. To this end, the aggregation engine 120 may include a graph reader 121, a feature reader 122, and a sparse aggregator 123.

The graph reader 121 may fetch graph input data and extract vertices and edges. The feature reader 122 may generate feature vectors for the edges. The sparse aggregator 123 may receive vertices and edges from the graph reader 121 and feature vectors from the feature reader 122 to perform aggregation operations. GCN accelerators can be classified into two types depending on which process is performed first among the aggregation phase and the combination phase. When the aggregation phase is performed first, the sparse aggregator 123 may carry out the accumulation of features by performing an operation between adjacency matrices and feature vectors for vertices and edges, and may calculate weights by the combination engine 140. When the combination phase is performed first, the sparse aggregator 123 may calculate adjacency matrices for vertices and edges after performing an operation between the accumulation of features and weights by the combination engine 140. This will be described in more detail with reference to FIG. 6.

The on-chip cache 130 may store feature vectors. The on-chip cache 130 may operate as a buffer for exchanging data between the aggregation engine 120, the combination engine 140, and the memory 110.

The combination engine 140 may generate a systolic array for matrix multiplications based on feature vectors taken from the on-chip cache 130 and weights taken from the memory 110. The combination engine 140 may perform a rectified linear unit (ReLU) operation on the systolic array and compress the result of the ReLU operation. The combination engine 140 may perform a bitmap-index embedded in-place CSR (BEICSR) format compression based on whether the result of the ReLU operation is zero or non-zero. The combination engine 140 may update the memory 110 by storing the result of the BEICSR format compression in the on-chip cache 130. This will be described in more detail with reference to FIG. 7.

Figure 2:
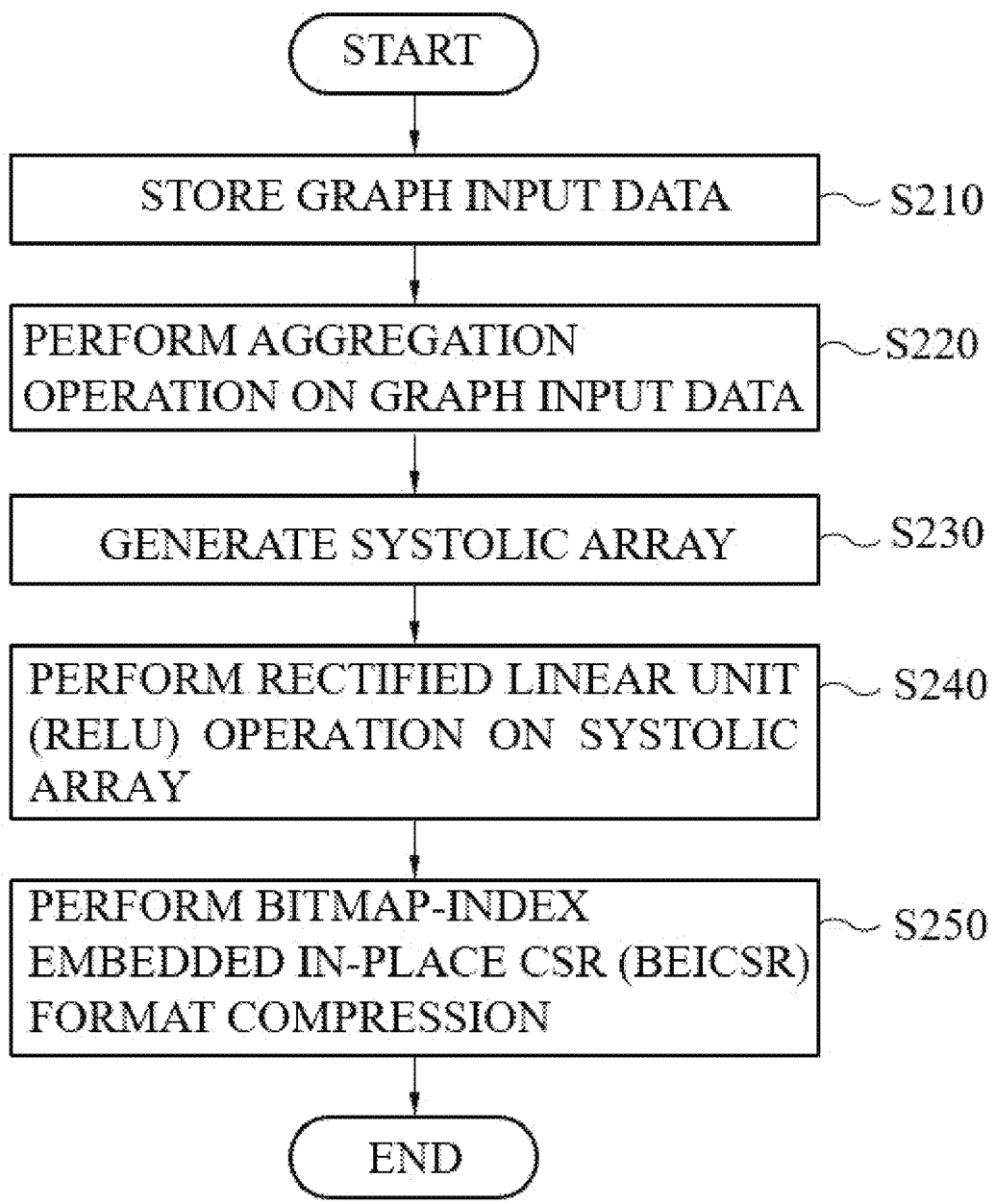
FIG. 2 is a flowchart for illustrating an embodiment of how to accelerate neural networks according to the present disclosure.

FIG. 2 is a flowchart for illustrating an embodiment of how the apparatus for accelerating neural networks accelerates GCNs according to the present disclosure.

Referring to FIG. 2, the apparatus 100 for accelerating neural networks may store graph input data including vertices and edges in the memory 110 at S210. The apparatus 100 for accelerating neural networks may fetch graph input data from the memory 110 through the aggregation engine 120 and perform an aggregation operation on the graph input data to process the accumulation of features and generate feature vectors at S220.

In addition, the apparatus 100 for accelerating neural networks may generate a systolic array for matrix multiplications based on feature vectors and weights obtained from the memory 110 through the combination engine 140 at S230. To this end, the apparatus 100 for accelerating neural networks may cache feature vectors in the on-chip cache 130.

Furthermore, the apparatus 100 for accelerating neural networks may perform a rectified linear unit (ReLU) operation on a systolic array through the combination engine 140 at S240. The apparatus 100 for accelerating neural networks may perform the bitmap-index embedded in-place CSR (BEICSR) format compression based on the result of the ReLU operation through the combination engine 140 at S250.

Hereinafter, the apparatus for accelerating GCNs according to the present disclosure will be described in more detail with reference to FIGS. 3 to 17.

Figure 3:
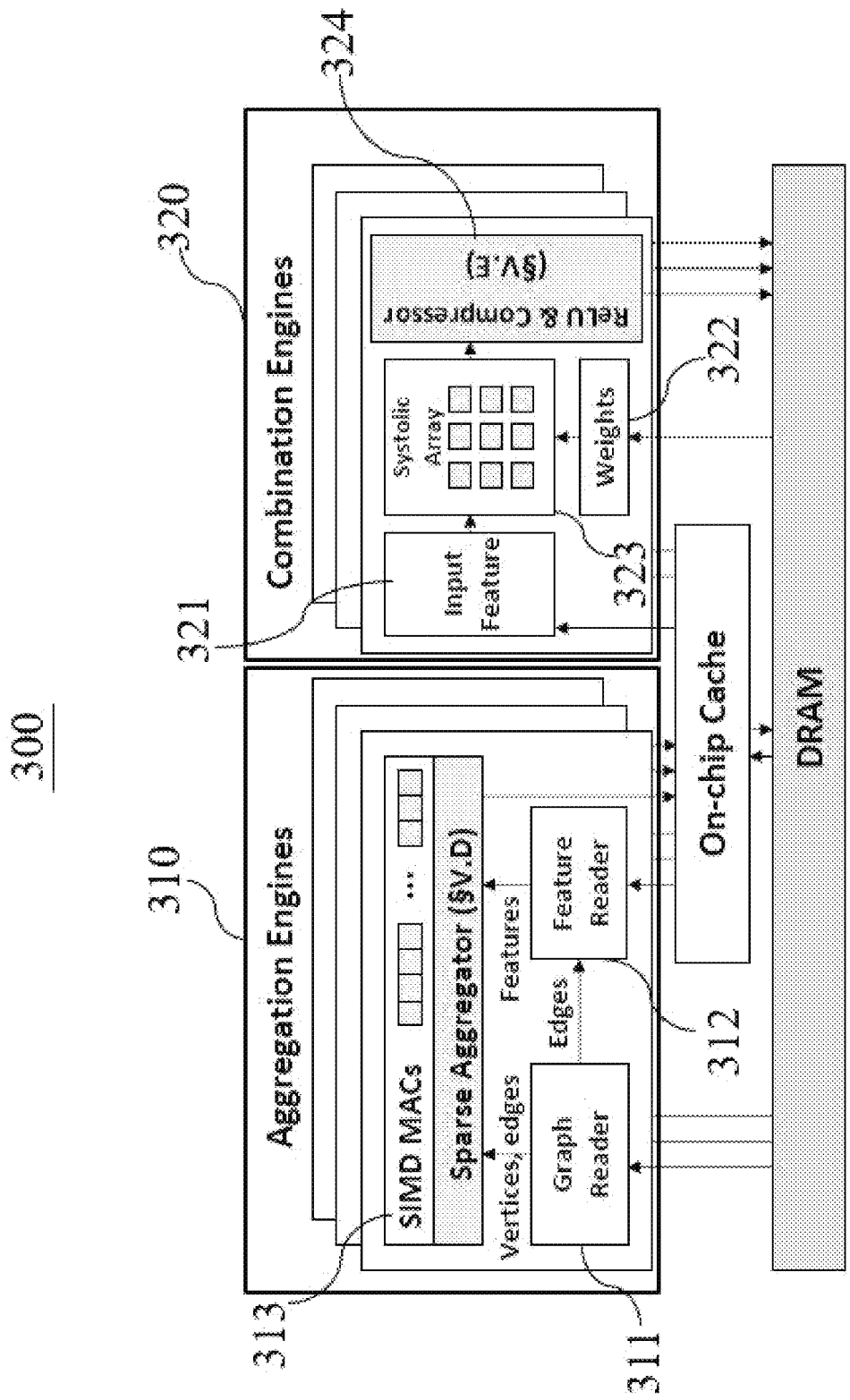
FIG. 3 is a view for describing a GCN accelerator architecture.
Figure 4:
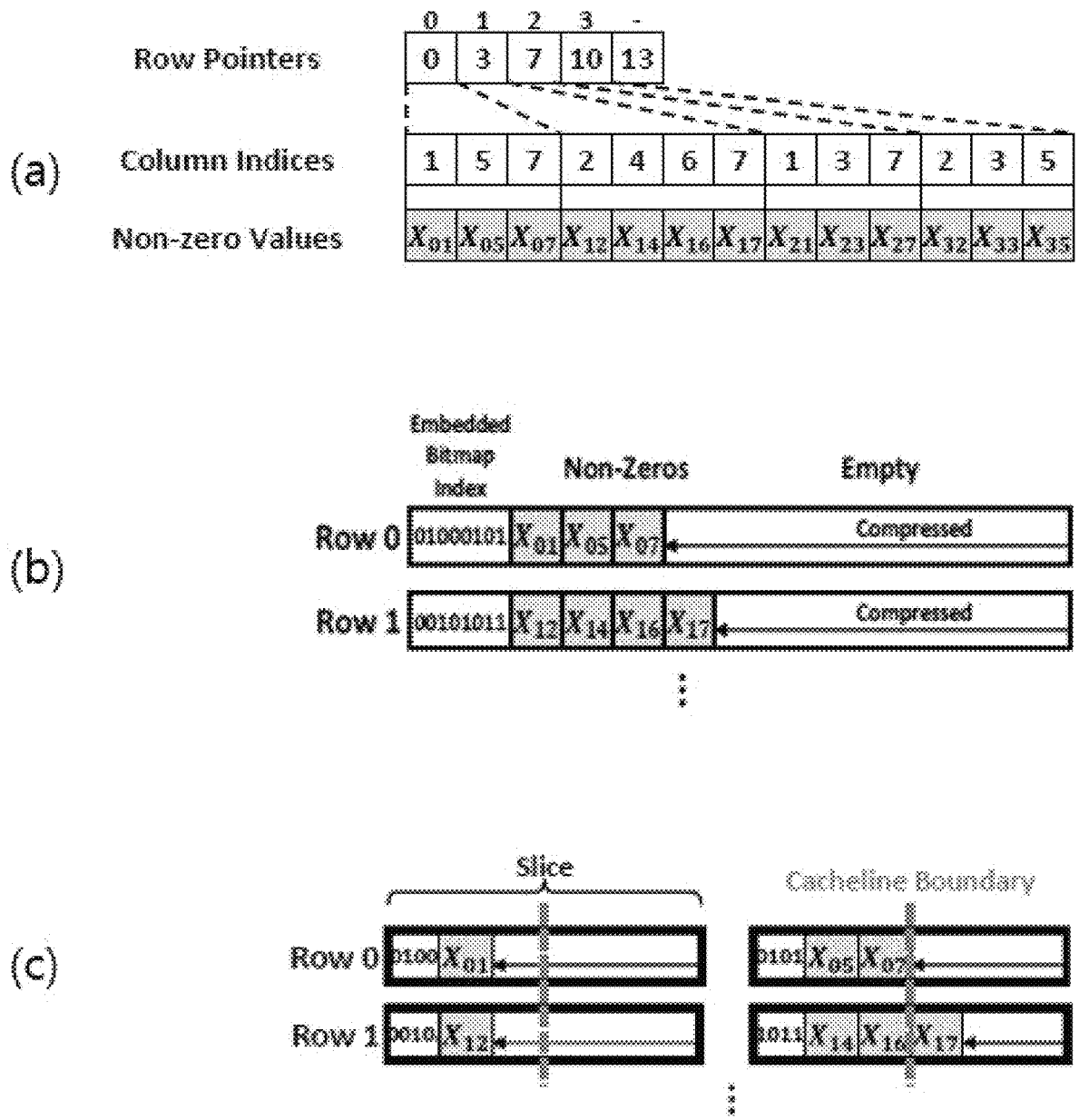
FIG. 4 is a view for describing compression formats of feature matrix according to the present disclosure.
Figure 5:
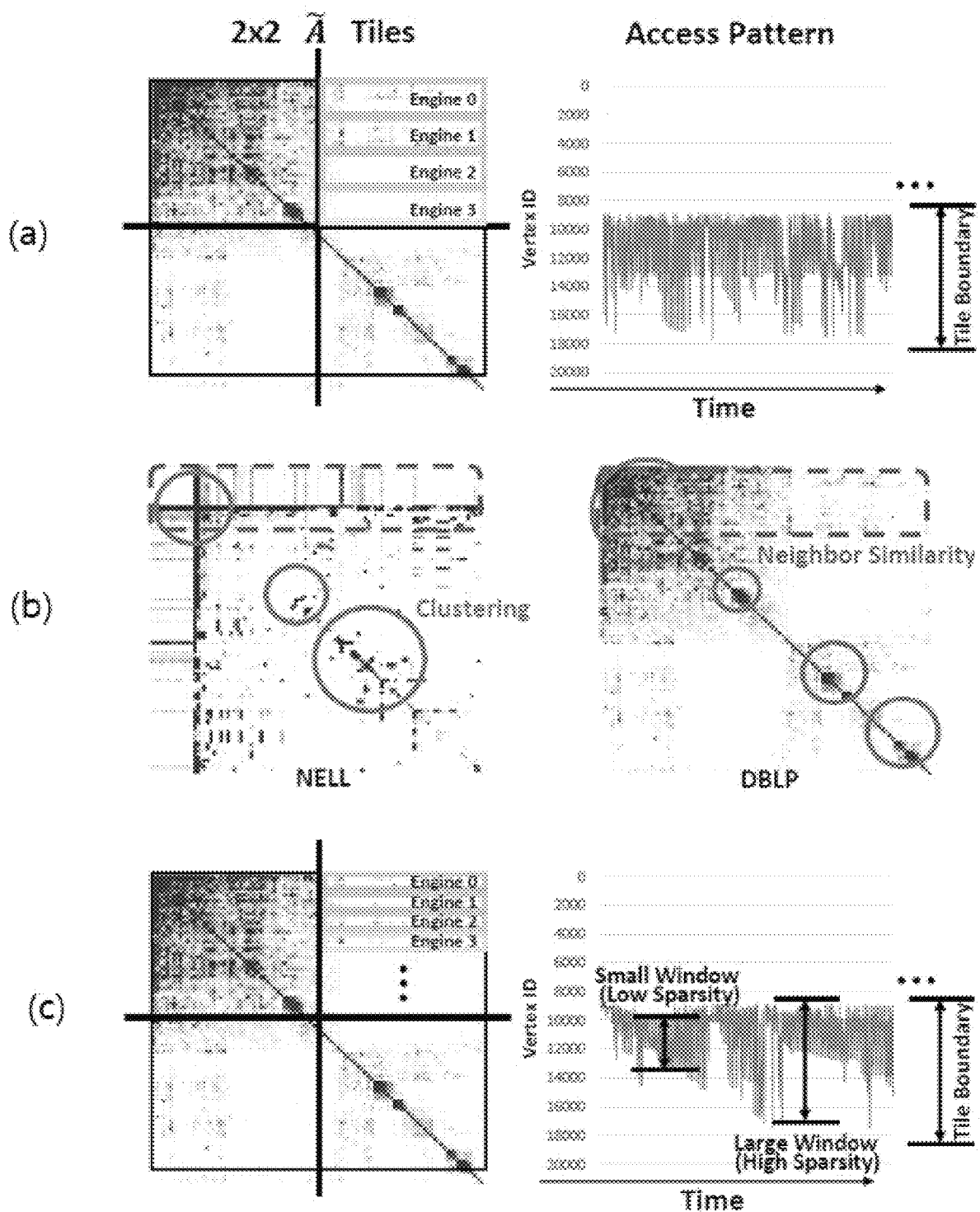
FIG. 5 is a view for describing a sparsity-aware cooperation according to the present disclosure.
Figure 6:
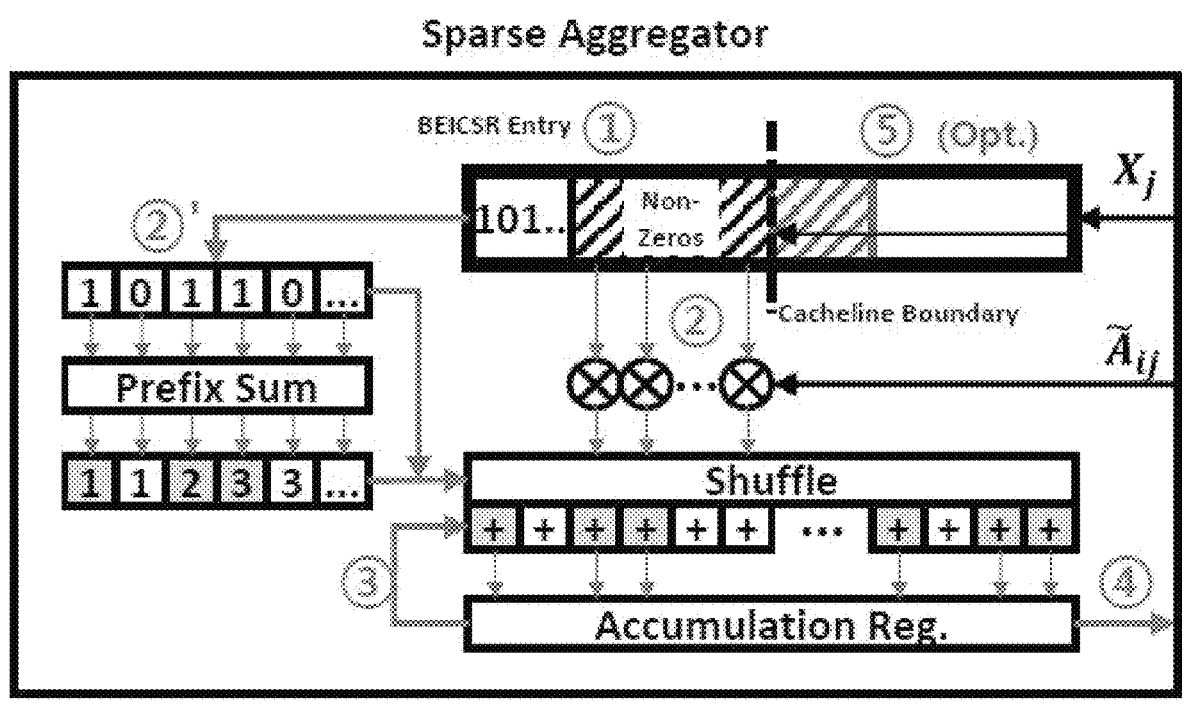
FIG. 6 is a view for describing the sparse aggregator unit architecture of the GCN accelerator in FIG. 3.
Figure 7:
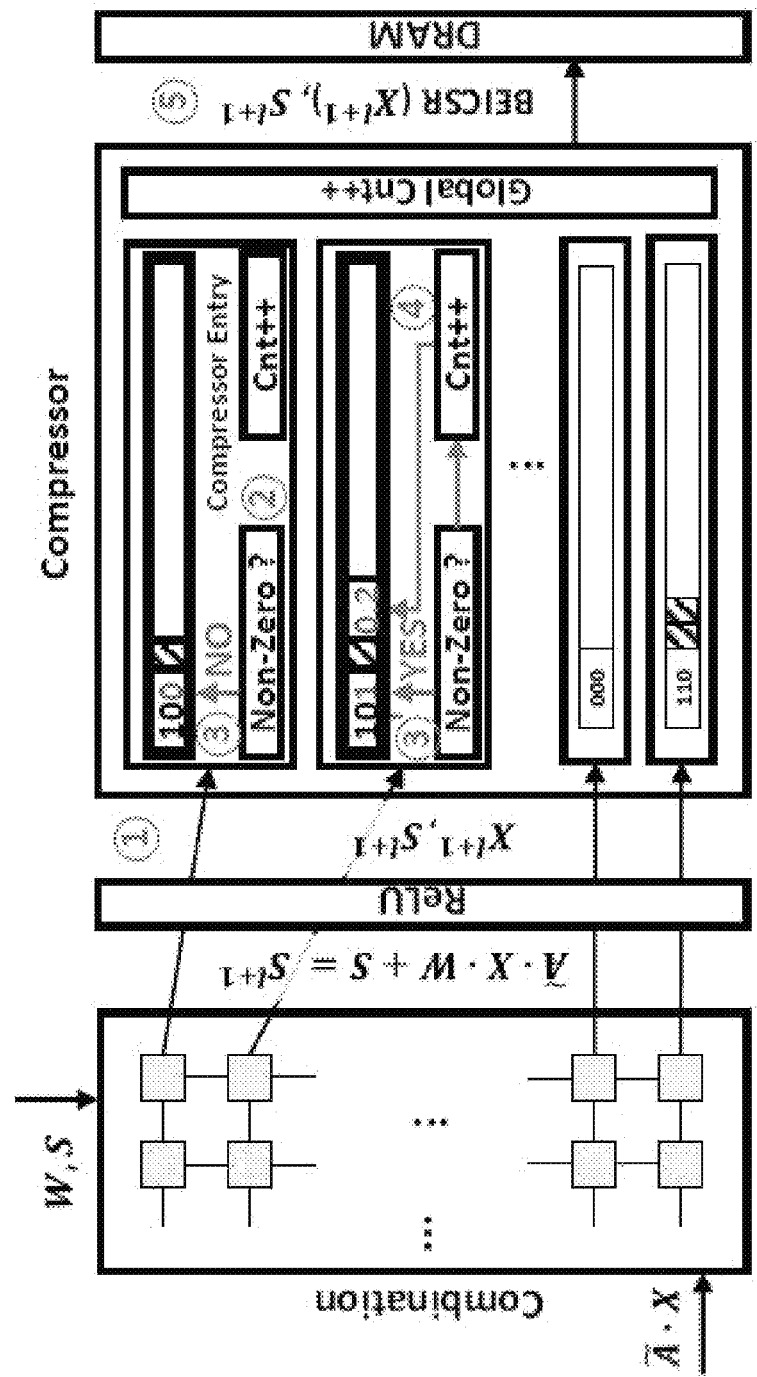
FIG. 7 is a view for describing the compressor unit architecture of the GCN accelerator in FIG. 3.
Figure 8:
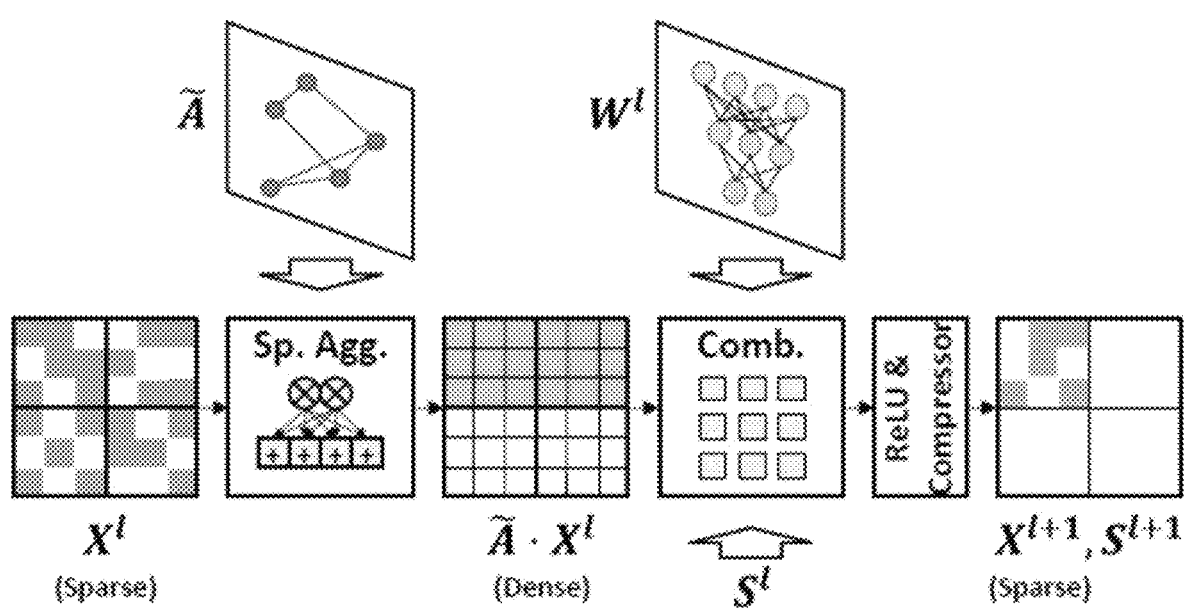
FIG. 8 is a view for describing a processing procedure of the GCN accelerator in FIG. 3.
Figure 9:
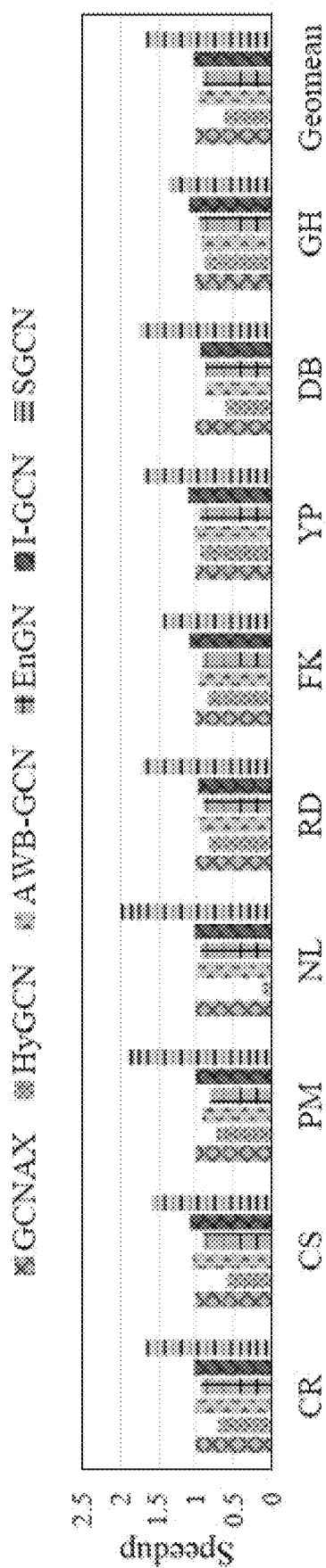
FIGS. 9 and 10 show the results of comparing the performance of the apparatus for accelerating neural networks according to the present disclosure.
Figure 10:
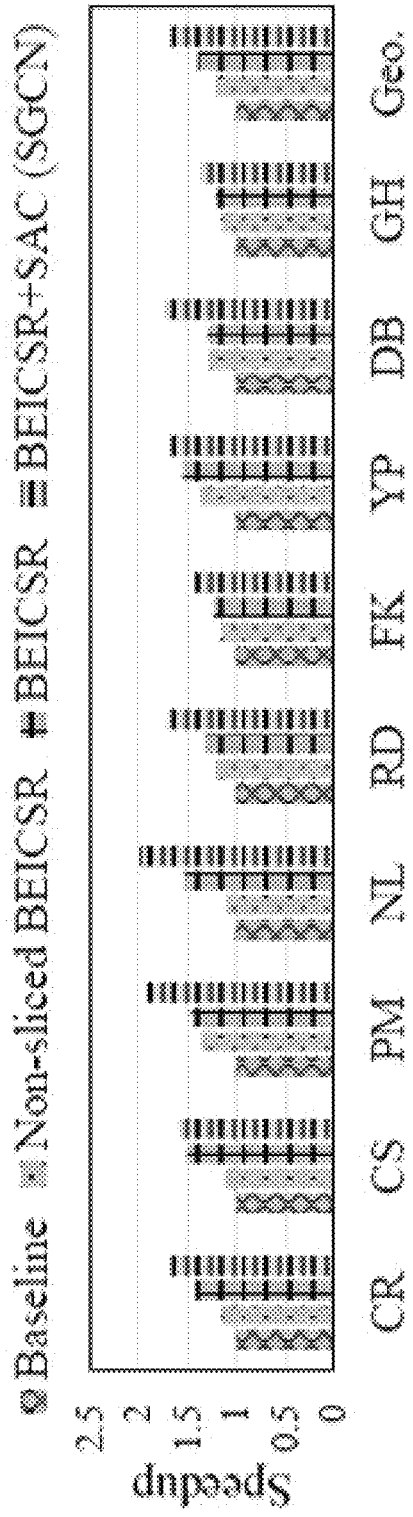
Figure 11:
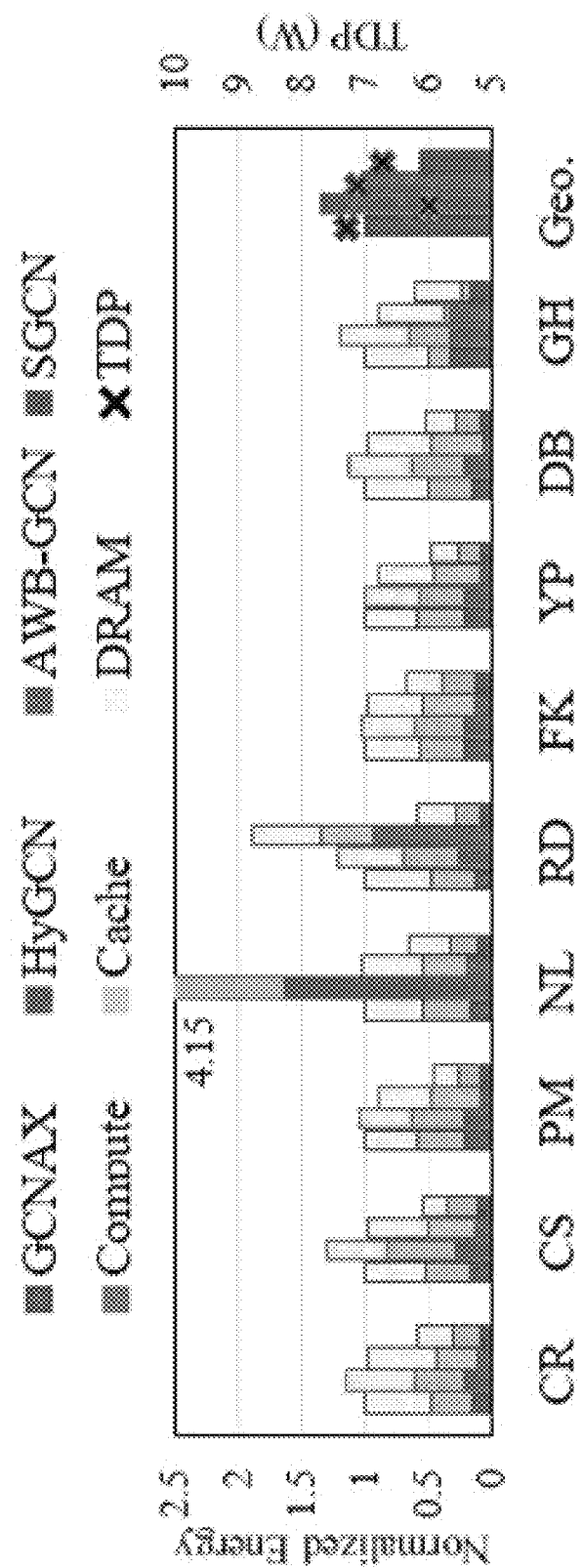
FIGS. 11 and 12 show energy consumption breakdown and the result of an experiment on off-chip memory access according to the present disclosure.
Figure 12:
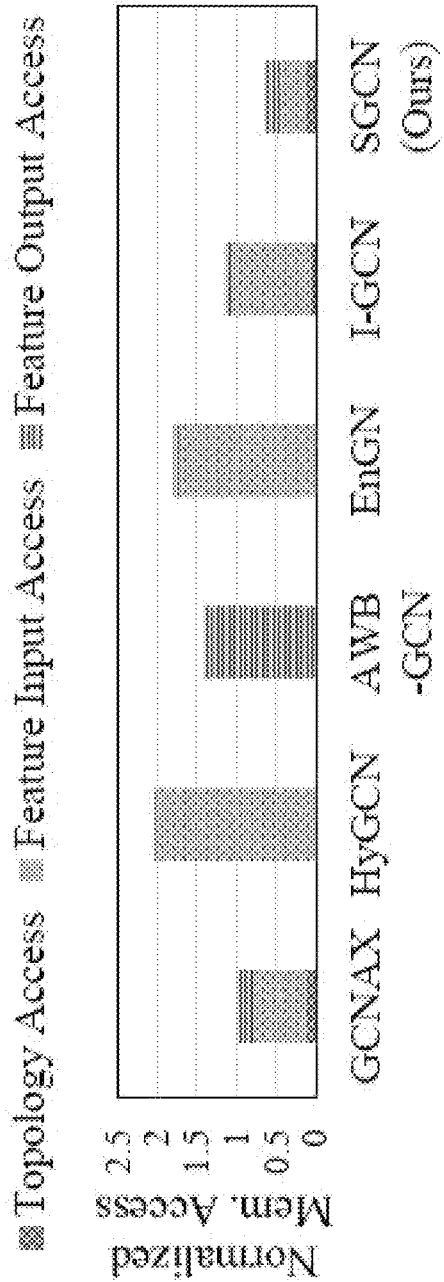
Figure 13:
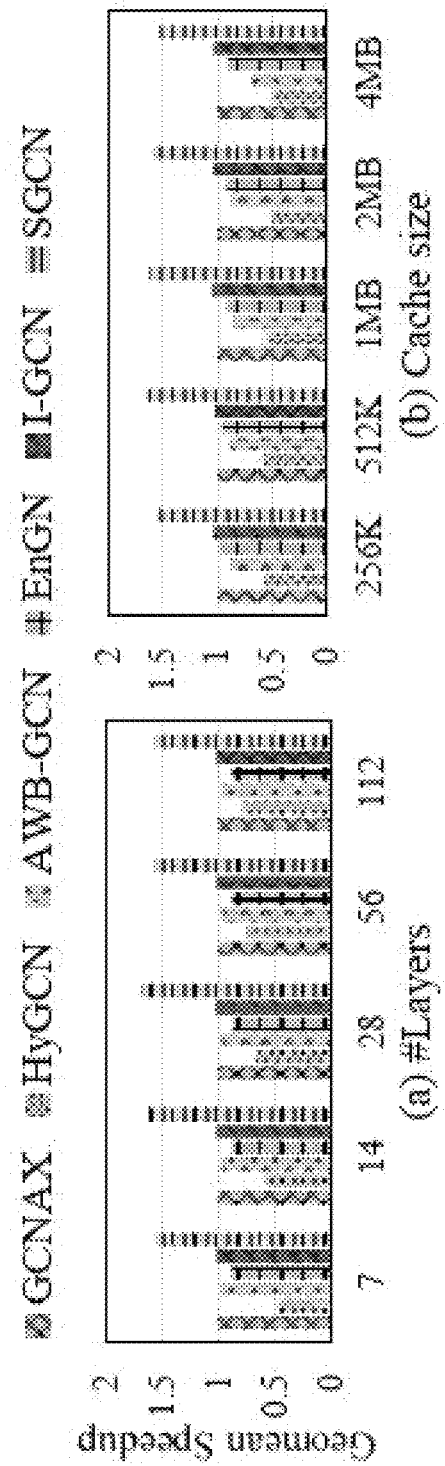
FIGS. 13 to 15 show sensitivity of performance according to the present disclosure.
Figure 14:
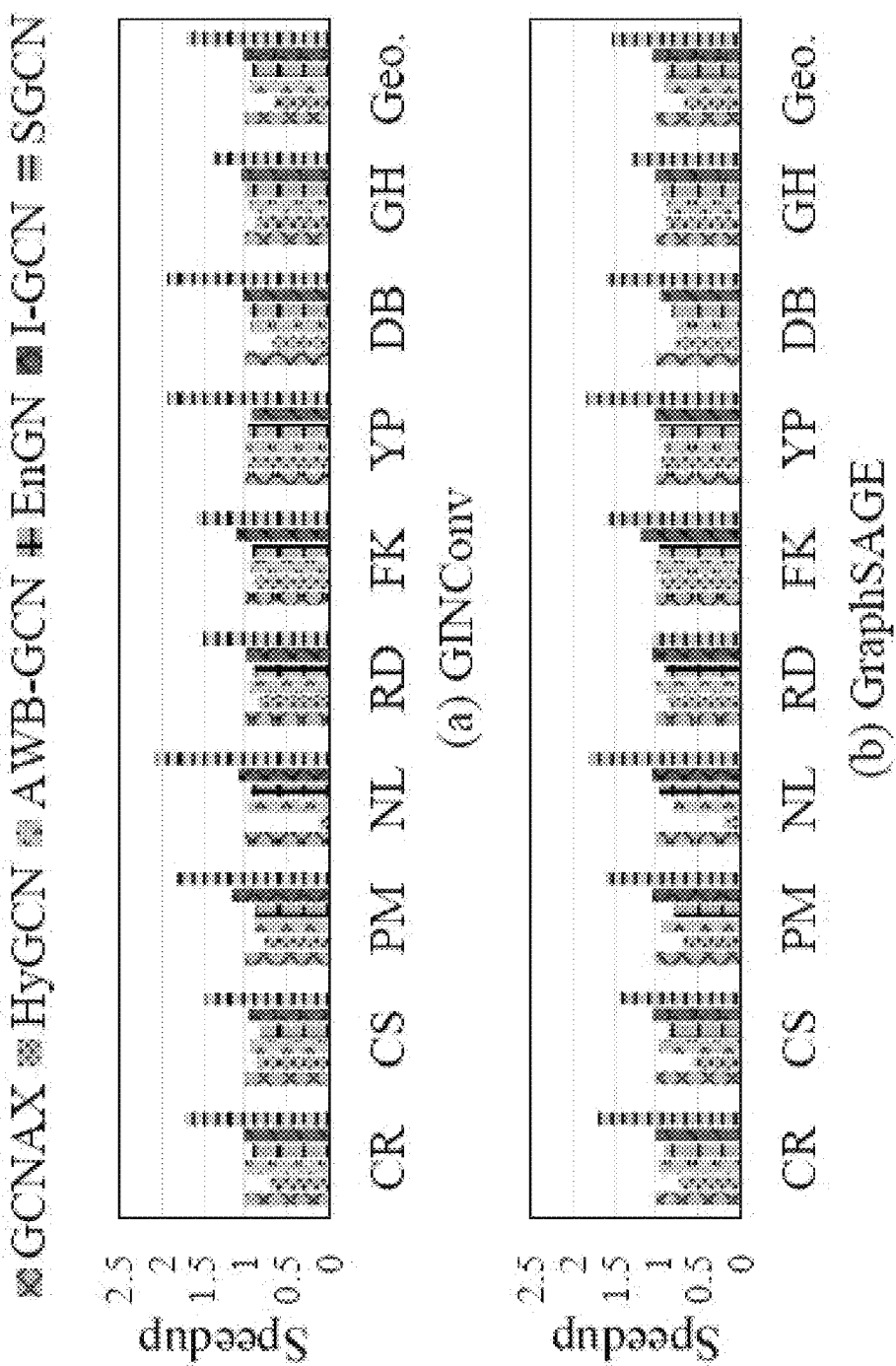
Figure 15:
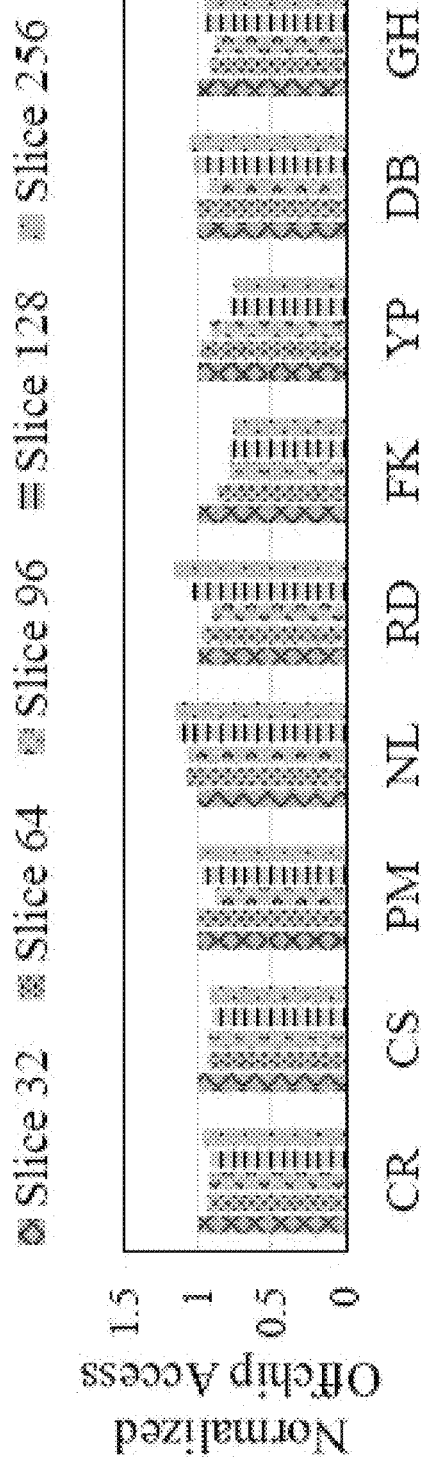
Figure 16:
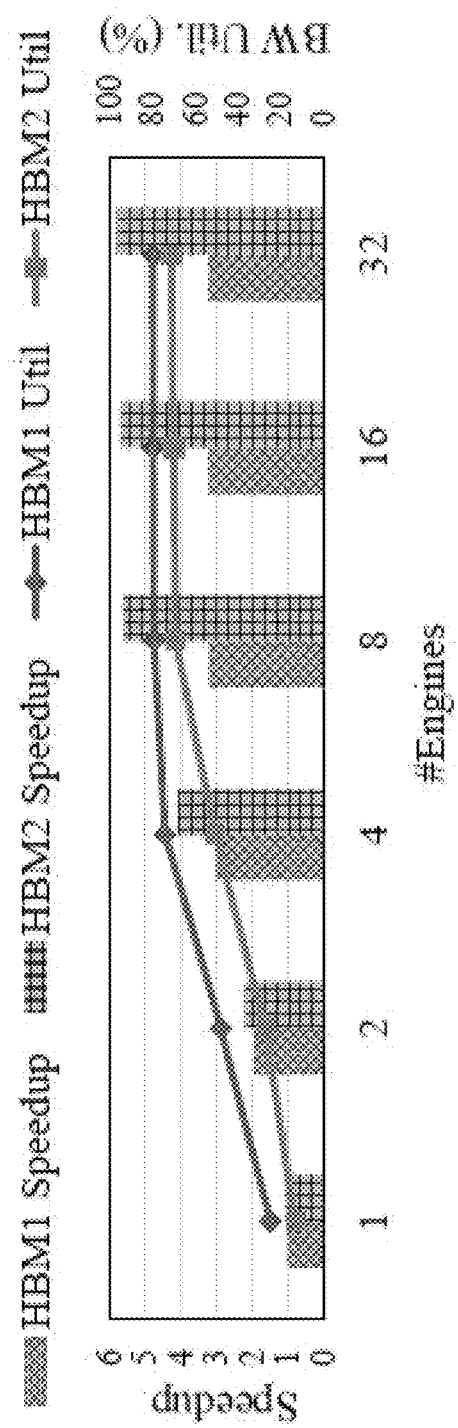
FIG. 16 shows scalability depending on memory types according to the present disclosure.
Figure 17:
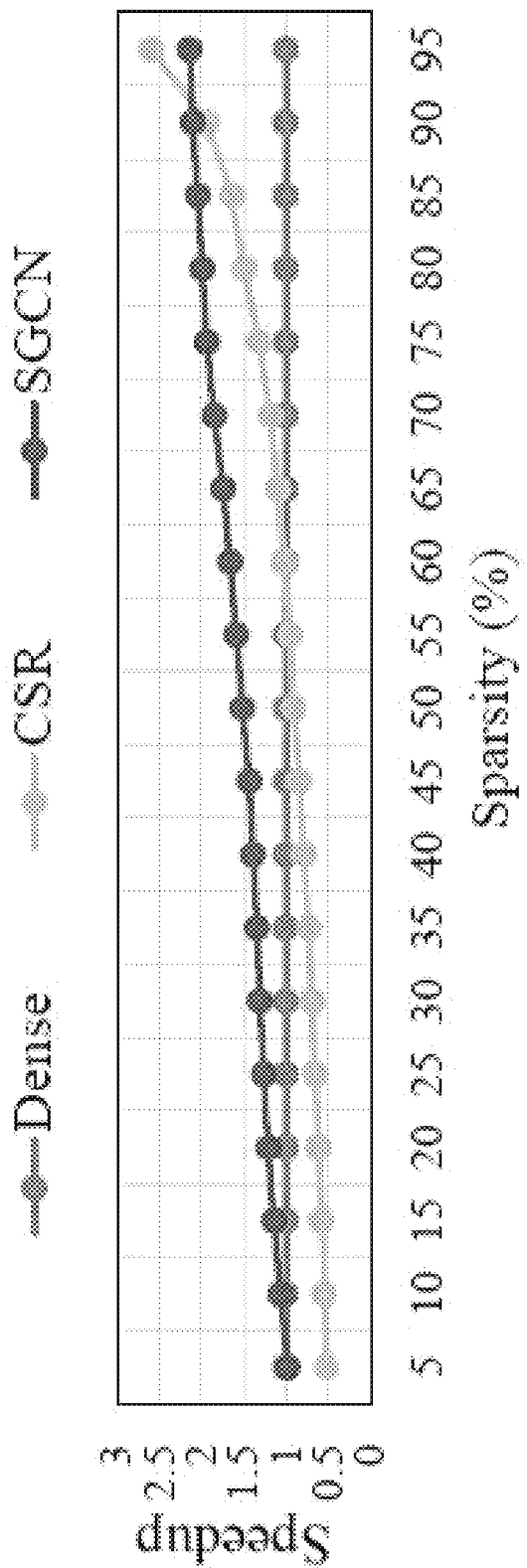
FIG. 17 shows the result of comparing performance on various levels of sparsity of features according to the present disclosure.

FIG. 3 is a view for describing the GCN accelerator architecture, FIG. 4 is a view for describing the compression formats of the feature matrix according to the present disclosure, FIG. 5 is a view for describing the sparsity-aware cooperation according to the present disclosure, FIG. 6 is a view for describing the sparse aggregator unit architecture of the GCN accelerator in FIG. 3, FIG. 7 is a view for describing the compressor unit architecture of the GCN accelerator in FIG. 3, FIG. 8 is a view for describing a processing procedure of the GCN accelerator in FIG. 3, FIGS. 9 and 10 show the results of comparing the performance of the apparatus for accelerating neural networks according to the present disclosure, FIGS. 11 and 12 show energy consumption breakdown and the result of an experiment on off-chip memory access according to the present disclosure, FIGS. 13 to 15 show sensitivity of performance according to the present disclosure, FIG. 16 shows scalability depending on memory types according to the present disclosure, and FIG. 17 shows the result of comparing performance on various levels of sparsity of features according to the present disclosure.

Referring to FIG. 3, the GCN accelerator architecture may include an aggregation engine 310 and a combination engine 320. According to an embodiment of the present disclosure, the aggregation engine 310 may include a sparse aggregation module 313 formed to have a plurality of processors each having a SIMD core structure, and may read the graph input data (A) by using a graphic reader module 311 and the feature (X) by using a feature reader module 312 to perform an A×X operation in the sparse aggregation module 313.

According to an embodiment of the present disclosure, the combination engine 320 may include a systolic array module 323, and may read the feature (X) by using an input module 321 and the weight (W) by using a weight reader module 322 to pass through the systolic array module 323 and perform an X×W operation. In addition, the combination engine 320 may include a ReLU operation and a compression module 324, and may perform a ReLU operation on a systolic array by using the ReLU operation and the compression module 324 and carry out a BEICSR format compression based on the result of the ReLU operation.

The apparatus 100 for accelerating neural networks according to the present disclosure may process the accumulation of features by performing an operation between adjacency matrices and feature vectors for vertices and edges in order to utilize the sparsity of graph input data in the above-described structure, and may perform a ReLU operation on a systolic array and a BEICSR format compression. It may be possible for the apparatus 100 for accelerating neural networks to efficiently process a sparse format for features in the aforementioned manner and reduce memory access to solve the bottleneck of GCN execution. In addition, it may be possible that the compression format and its execution of the apparatus 100 are aware of a memory subsystem and exploit it.

In the meantime, in GCNs, the output feature of layer l can be expressed as shown in Equation 1 below.

$$X^{(l+1)} = \sigma\left(\tilde{A} \cdot X^{(l)} \cdot W^{(l)}\right), \quad \text{[Equation 1]}$$

where X denotes the input feature of the layer, $\tilde{A}$ denotes the adjacency matrix of the graph, W denotes the weight, and $\sigma$ denotes the non-linearity activation function (e.g., ReLU).

Furthermore, $\tilde{A} \cdot X^{(l)}$ and variations thereof may correspond to an aggregation, and variations of X·W may correspond to a combination. In the meantime, the introduction of residual connections may increase the sparsity of intermediate features, improving the performance of GCNs. The key to the GCN accelerators may be supporting the hybrid nature of aggregation and combined phases.

The GCN accelerator in FIG. 3 may correspond to a GCN accelerator 300 that utilizes the sparsity of the graph. The aggregation engine 310 may use SIMD MAC cores to process the aggregation of features from multiple vertices. The topology matrix $\tilde{A}$ is assumed to be in a CSR format to employ the high sparsity. Similar to graph processing accelerators, the graph reader module 311 may read the indices vertex indices and the corresponding edges. From the edge information, the feature reader module 312 may fetch the feature vectors of the edge destinations. Together, these modules may feed the SIMD cores to continuously process the aggregation without being stalled. Each module may have a small buffer for temporarily storing prefetched values to avoid stalls from upstream backpressure.

As accesses to the feature vectors from neighboring vertices exhibit a highly randomized pattern over a wide range of data, a sizable on-chip memory may be used as a global cache resembling a last-level cache in modern CPUs. However, the working set size may often far exceed the capacity of the global cache, thereby prohibiting an efficient use of the inherent locality in the feature vector accesses and leaving the aggregation phase highly memory intensive.

The combination engine 320 may contain a systolic array for matrix multiplications. The input feature and weight buffers may provide input matrices, X and W, respectively, to the systolic array. The output may be written back to the off-chip DRAM, becoming the input to the next layer.

The purpose of the present disclosure is to devise a sparse format for the features and design an accelerator microarchitecture that efficiently processes them. To achieve the purpose, the following design goals are set.

First, the primary target should be the memory access reduction, not the computation or the capacity. The primary bottleneck of GCN execution is known to be the aggregation phase, which is extremely memory intensive. This indicates that solely optimizing the amount of computation without memory traffic reduction (e.g., zero skipping) would not be an optimal choice.

Second, the format and the resulting access pattern should be cache- and DRAM-friendly. In contrast to CNNs where the feature accesses can be done sequentially, GCN aggregation features incur random accesses of small per-vertex features (i.e., a few cache lines). When dealing with sparse formats, special care must be taken that each access is aligned to the cache line and/or the DRAM burst length to optimize off-chip traffic. Furthermore, because the intermediate features are dynamically created as a result of the previous layer, the format should allow parallel writes as well as reads. Especially with variable length rows as a result of compression, it is easy for the access pattern to exhibit many unaligned accesses or bank conflicting accesses. Such a problem appears more often for modern memory systems such as HBM that do not support multi-rank channels. Thus, the compression format and its execution should be aware of the memory subsystem and exploit it.

Third, the execution should embrace existing GCN accelerators. For example, existing accelerators employ overlapping between phases or topology/feature tiling. Naively applying compressed format and execution flow could potentially disable such techniques, especially with variable sparsity levels that cannot be estimated statically. With the sparsity-aware GCN execution, such techniques must be embraced to achieve maximum performance.

According to the present disclosure, the ultimate purpose of compression may be to reduce off-chip memory access. This may be sensitive to the compression format employed for the feature matrix. Compared to the conventional sparse DNN accelerators, the difference is that the feature matrix of GCNs may exhibit a highly randomized pattern due to the extremely sparse nature of the topology matrix $\tilde{A}$. For each random access, a portion of a vertex feature array may be accessed, which usually spans a few cache lines.

A naive choice for dealing with sparse data is a compressed sparse row (CSR). However, applying a naive CSR will not result in off-chip traffic reduction. With CSR, every non-zero element requires two values: one for the column index and the other for the value itself. Therefore, at sparsity below 50%, there is only capacity overhead instead of reduction.

To tackle the above-mentioned issues, a bitmap index embedded in-place CSR (BEICSR) format for the intermediate GCN features is proposed.

FIG. 4 illustrates the conventional CSR format (a) and the compression format proposed in the present disclosure (b). In the case of the BEICSR format proposed in the present disclosure, instead of column indices, bitmap indices may be used for each vertex. For example, if an example array of size four is (0, 0.3, 0.5, 0), 0110'b may be followed by the non-zero array (0.3, 0.5). Assuming the feature vector has elements with 50% sparsity, and each element occupies 32 bits, it may be possible to calculate the overhead of the bit vector index. When the feature vector width is n, the bitmap index size is n bits, and the non-zero feature data size is 32n×0.5=16n. Therefore, it leads to a total index overhead of only 6.25% in that case (n/16n), which would be much lower than that of the naïve CSRs that require one integer index per non-zero element. On the other hand, if CSRs are used for the same 50% sparsity, a 32n×0.5 overhead is provided for the column indices plus the row pointers to indicate the starting location of the arrays. Combined with the non-zero feature data size, it would result in an increased size instead of compression.

In addition, it is proposed to embed the bitmap index at the head of the same array that stores the non-zero values. In compressed formats, indices are commonly placed in an independent array. However, such a choice may result in a poor memory access pattern. When a bit vector index for a row is accessed, the surrounding cache line containing indices for other rows is always accessed together in single memory access. Unless reused before eviction, they are considered overhead. Observing the access pattern, the accesses to the bit vector index are almost always followed by the non-zero values. The only exception is when the bit vector indices all contain zeros. (i.e., no non-zero element in the row). However, considering that the sparsity is around 50% and each element has little dependence on the other, such an occasion is unlikely. Therefore, the choice of embedding the bitmap index in the same array with the non-zero values may yield a better memory access pattern. There are some formats using bitmap indices, but they rely on entirely empty rows or blocks and hence may not be inappropriate for GCN features.

A common problem with using compressed formats for performance is the variable lengths. Not only this would necessitate an indirection array similar to a row pointer, but also result in frequent misaligned memory accesses that lead to traffic volume overhead. To store the offsets for each row, some indirection array equivalent to a row pointer would be needed. Instead, the data is compressed row-by-row, and each row is stored at the same reserved place in the memory as if the row is left uncompressed. Even though this would give no benefit to the memory capacity, such a choice may be necessary for the following reasons.

First, it would provide reduced off-chip traffic aligned to the cache line boundaries. The alignment is especially important, since the access granularity only spans a few cache lines. Much of the space reserved for a row would be empty, and therefore not accessed from the memory. Furthermore, the beginning of each row can be cache line-aligned, such that the loss from misalignment can be minimized. Second, it allows parallel writes at the output of each layer. Naively using a variable length storage format requires serialization, because the size of the compressed feature array from each vertex is an unknown. Such a choice would incur an intolerable overhead to the execution time. Lastly, because the sizes of the rows are uniform, there is no need for an indirection array. Locating the compressed data only involves a multiplication with the vertex ID, which eliminates the need for accessing indirection arrays. This scheme reduces the memory access count, contributes towards row-buffer locality, and achieves better memory bandwidth utilization.

With regard to many modern GCN accelerators, slicing the feature matrix is proposed for better data reuse. When compressing the entire row together, accessing a slice of the feature matrix involves the following sequence: 1) Read the bit vector index to find the range of non-zero values corresponding to the slice, 2) read multiple cache lines that contain non-zero values from the slice, and 3) perform aggregation.

The pitfall from the above-mentioned sequence is the overhead of unaligned accesses. For example, when there are 16 non-zero values (64 bytes) in a slice, unaligned access would almost always require two 64B cache lines, which neutralizes the benefit from the sparsity.

Therefore, sliced BEICSR is employed as depicted in (c) of FIG. 4. Instead of a single set of bit vector indices for the entire row, the bit vector is partitioned and embedded in the head of each corresponding unit slice. Then, the slices are aligned to the burst boundaries. Using the in-place compression for each slice, the memory space for holding the maximum number of non-zeros (i.e., a dense slice) is allocated therein. With the right choice of the unit slice size C, the wasted amount of memory access can be minimized because the number of non-zero elements has a small variance and there are only a few outliers. When a larger slice size is desired, it may be possible to simply combine multiple unit slices to form a large logical slice, which incurs almost no difference compared to having a large slice in the first place.

Another promising technique for GCN execution is graph topology tiling. Partitioning the adjacency matrix into multiple tiles helps reduce the working set size of the intermediate features such that it fits into the cache size. In the case of existing approaches, the optimal tile size is usually found based on an off-line analysis, often by statically calculating the working set size. However, according to the present disclosure, the level of sparsity varies dynamically depending on each vertex, dataset, and layer. Consequently, estimating the optimal tile size is very difficult, and a working set size exceeding the cache capacity results in significant performance degradation.

(a) of FIG. 5 shows how conventional graph tiling works on an example of 2×2 tiling. On the right side, it shows vertex IDs of the features that are accessed for the first 300 reads. When a graph is partitioned into tiles, the working set size is confined to the features of the vertices included in a tile, which can fit into the cache. However, when the sparsity of the features is lower than expected, the effective working set size increases because there are more non-zeros per vertex. This has the risk of exceeding the cache capacity, and the performance would quickly drop due to the thrashing pattern.

To address this issue, sparsity-aware cooperation is proposed as a method of altering the access pattern such that there are variously sized working sets that can be captured by the caches. It is known that graphs often form community clusters and there exists a neighbor similarity between adjacent vertices. For example, the example density map from NELL and DBLP displayed in (b) of FIG. 5 shows that adjacent rows tend to exhibit the same patterns, and have strong clustering around the diagonals.

Sparsity-aware cooperation takes advantage of this, and each engine accesses a small strip of vertices in an interleaved manner as illustrated in (c) of FIG. 5. For the height of strips, 32 is empirically used. Because of the neighbor similarity and clustering, the access distances tend to be shorter, and there are multiple working sets with diverse sizes that can be captured. As a result, when the sparsity level is high, the cache will capture the larger working set window (denoted as "large window"), and, when the sparsity is low, the cache can capture a smaller working set window to avoid thrashing (denoted as "small window").

Referring to FIG. 6, the sparse aggregator has 16 multipliers, and therefore, can process a single cache line worth of data together. ① When a row of the feature matrix X is selected, its first 64 bytes are fetched to the aggregation engine, where its head contains the bitmaps and the rest contains the non-zero values. ② The non-zero values are multiplied with the corresponding edge weight of Γ broadcasted by each multiplier. ②' In parallel, the bitmap is processed by a parallel prefix sum unit to convert the 1's in the bitmap to a reversed index to the non-zero values. ③ The bitmap and the reversed indices are sent to the accumulator. If the bitmap value is 1, the accumulators at the corresponding positions load the multiplier outputs and add them to the current value. ④ When the accumulation for a single vertex is complete, it is sent to the combination engine for performing combination, ReLU, and compression. ⑤ (Optional) When there are still non-zeros remaining in the next cache line (identified by the prefix sum result), the next 64 bits are fetched to perform ① to ④ again.

Referring to FIG. 7, to avoid the extra memory access for the compression, the compressor is placed at the output stage of the combination engine using an output-stationary systolic array. One compressor entry containing BEICSR buffer and compression logic is assigned to each row of the systolic array. ① When the combination phase is complete, the data are streamed to the compressor after processing the residual addition and the ReLU activation. ② The compression logic checks whether the output value is zero. ③ If the output value is zero, the bitmap index in the compression entry appends a 0. ③' When the output value is non-zero, the bitmap index accumulates a 1, and ④ the output value is saved to the location pointed by the counter. The compressor continuously performs ① to ④ for each output value from the systolic array. ⑤ After the compressor has processed a unit slice amount of data, the data stored in the buffer is flushed to the DRAM, and the compressor is re-initialized.

Referring to FIG. 8, in the case of the GCN accelerator in FIG. 3, the aggregation engine takes Ã, the graph topology in CSR format, and $X^l$ in BEICSR format from the output of the previous layer. Row-product-based dataflow is used, and tiling is applied to both the graph topology Ã and feature $X^l$. The resulting $\dot{A} \cdot X^l$ will be dense, because each row of $\dot{A} \cdot X^l$ will be a weighted sum of several rows from $X^l$.

After a block of $\dot{A} \cdot X^l$ is calculated from the sparse aggregator unit, it will be sent to the systolic-array-based combination engine. The systolic array will multiply $\dot{A} \cdot X^l$ with $W^l$, which is essentially a GeMM operation. To perform the residual addition, the registers at the systolic arrays are initialized with $S^l$ instead of zero. When a sliced row of $\dot{A} \cdot X^l \cdot W^l$ is calculated, it is fed to the compressor unit after being activated by ReLU. The output of ReLU activation is the next layer's input feature $X^{l+1}$. Before being written to the memory, the post-combination compression unit converts the row of $X^{l+1}$ into the BEICSR format. In modern GCN architectures, the input and output feature widths are often the same. In such cases, $X^l$ consumes the same capacity as Ã·X, and compressed $X^l$ is written in place of Ã·X to reduce the memory requirement.

Optionally, when the input feature is extremely sparse, the combination of the first layer may be performed on the sparse aggregator engine instead of taking advantage of the sparse input features. Even though this technique only applies to the first layer, this may bring a meaningful speedup to some datasets. GCNs according to the present disclosure do not require much additional cost for realizing the baseline GCN accelerator. For the sparse aggregator units, only the additional prefix sum units are required to read the bitmap index. In addition, the global counter and non-zero comparators are added to the basic combination engine to write the bitmap index in addition to the features.

FIG. 9 shows the result of comparing performance of the GCN accelerator with that of existing accelerators. For the comparison, HyGCN based on hybrid engines, EnGN using vertex tiling and degree-aware vertex caching (DAVC), and AWB-GCN employing column-product-based execution and applying aggressive load-balancing techniques may be used. In addition, I-GCN adopting dynamic reordering to enhance the locality of the graph topology and GCNAX that is based on perfect tiling and suggests optimized loop ordering based on off-line analysis may be used. Among them, the GCNAX is selected as the baseline.

The results show that the GCN architecture (hereinafter, referred to as "SGCN") according to the present disclosure achieves 1.66× speedup over the baseline GCNAX in geometric mean, and 2.71× over the HyGCN. Because GCNAX employs aggressive tiling for both the topology (Ã) and the intermediate features (X), the speedup of the SGCN is mostly from exploiting the feature sparsity. The speedup over the HyGCN is mainly coming from two factors: reduced amount of DRAM accesses due to the usage of BEICSR format, and cache efficiency from graph/feature tiling. Because the HyGCN does not perform any tiling/slicing, it suffers from a low cache efficiency for large graphs. The AWB-GCN adopts zero skipping on the features, which is a kind of sparsity-aware method. However, the AWB-GCN stores the features in a dense format that yields no benefit to the memory traffic. Moreover, it uses the sparsity of the features only in the combination phase which only takes a small portion of the total GCN execution. By adopting a sparse format to reduce the memory traffic, the SGCN outperforms the AWB-GCN by 1.73× in geometric mean. The SGCN also achieves 1.85× speedup compared to the EnGN. The degree-aware vertex cache used for the EnGN is effective over the HyGCN, but its limited vertex tiling still makes lower cache efficiency, so the SGCN has an extra advantage over the EnGN.

Over the baseline, a large speedup was observed on PubMed and NELL dataset with 1.91× and 1.99× improvement over the GCNAX, respectively. The PubMed dataset exhibits high intermediate feature sparsity of almost 70%, which translates to a high speedup in the aggregation phase. On the other hand, the NELL dataset shows relatively lower feature sparsity. However, its input feature width is exceptionally long (61,278) and is also ultra-sparse (99.9%) because the input features are one-hot encoded vectors. Thus, this unique input layer brings additional speedup in addition to the speedup from the intermediate features. On the other hand, speedup numbers from Cora and CiteSeer are similar to the geomean, despite its relatively high sparsity. This is partially because of the small dataset. When the graph topology is small, the relative portion of the combination phase increases, which amortizes the gain coming from the sparse aggregation. In addition, the average degrees of the two graphs are very low with 3.92 for Cora and 2.76 for CiteSeer where the geomean is 10.15 and the maximum is around 500 with Reddit. This means that the number of random accesses to the features is smaller than the other datasets, which also contributes to the amortization of the gain in sparse aggregation.

FIG. 10 shows how each proposed technique proposed in the present disclosure contributes to the performance improvement. More specifically, the non-sliced version of BEICSR is already sufficient to exploit the intermediate feature sparsity, but settles at suboptimal dataflow due to the lack of feature matrix slicing. As a result, the performance gain is often not large enough. When the feature matrix slicing is supported with the sliced version of BEICSR, sparsity is exploited on the optimal dataflow. Here, the geometric mean speedup is 38.5% from the baseline, which adds 17.7% on top of the non-sliced BEICSR. The sparsity-aware cooperation may be added to better capture the varying locality of the sparse features. This adds the extra 28.0% speedup in the geometric mean, which results in an overall 1.66× speedup. The sparsity-aware cooperation may add more gain in graphs with more clustered topology (DB) and high neighbor similarity (PM, RD).

FIG. 11 shows the advantage of energy consumption. SGCN may consume 44.1% less energy compared to GCNAX, 44.6%, and 58.1% compared to AWB-GCN and HyGCN, respectively. The energy savings may come from all three parts of the stack. Much of the energy consumption may come from memory accesses. Because the aggregation phase requires fewer data due to the sparsity, it may affect both the off-chip memory and cache access counts. In addition, the reduced number of multiplications in the aggregation may contribute to the energy reduction of the computation. For the peak power, SGCN consumes 6.74 W, which is less than AWB-GCN (7.03 W) and GCNAX (7.16 W). However, it shows higher peak power consumption compared to HyGCN (5.94 W) which has slow but simple architecture.

FIG. 12 shows the breakdown of the memory accesses during the execution of the RD dataset. In HyGCN, most of the accesses are to the feature. Because it does not use tiling nor utilize the feature sparsity, a lot of duplicate accesses are done to the features which comprise most of the memory access of HyGCN. EnGN reduced some accesses with its degree-aware vertex cache (DAVC). On the other hand, AWB-GCN is based on a column-product dataflow, and reads each input feature element exactly once. However, the expense is that it requires reading and writing the partial sums more often, which becomes dominating for the memory accesses. GCNAX has balanced memory access with aggressive tiling. I-GCN also shows balanced memory access due to its well-clustered reordering scheme. In contrast, the SGCN according to the present disclosure may dramatically reduce the amount of memory access. The main reduction may come from the sparse feature representation, which reduces the feature access by 54.3%.

FIG. 13 shows sensitivity to the number of layers in GCN and the cache size. In (a) of FIG. 13, the geometric averaged performance sensitivity to the number of layers in GCN is plotted using CR, CT, and PM datasets. In addition to the default setting of 28 layers, 7-to-112-layer GCNs was used. In all settings, the sparsity remains mostly constant, and the speedup trend persists. This shows that the performance gain from SGCN is not fine-tuned on a certain number of layers, and can be broadly used for various specifications. FIG. 15b shows that a speedup occurs as the cache size increases. In general, the speedup from the sparsity of features is not greatly affected by the cache size unless the data entirely fits into the cache. With a small cache, the benefit of sparsity-aware cooperation may become marginal because it becomes harder to capture any locality. However, even with larger caches, the speedup may remain relatively consistent.

FIG. 14 depicts the performance result comparison on two additional variants of GCN aggregation: GINConv and GraphSAGE. In both variants, SGCN achieves similar but slightly different speedup from those in FIG. 9. Unlike the GCN aggregation, the aggregation phase of GINConv does not require the edge weights. This decreases the size of Γ, and leads to an increase in the portion of the feature matrix during the aggregation. Because SGCN can efficiently reduce the accesses to the feature matrix, the speedup slightly increases compared to that of the vanilla GCN. On the contrary, GraphSAGE applies random sampling on the edges to reduce the computational overhead. It reduces the effective edge count of the graph topology and reduces the portion of aggregation. Thus, SGCN experiences slightly less but still significant speedup over the prior arts. In GINConv, SGCN may achieve 1.69× speedup over GCNAX and 2.57× over HyGCN. In GraphSAGE, SGCN may achieve 1.53× and 2.27× speedup over GCNAX and HyGCN, respectively.

Referring to FIG. 15, another implication of the use of in-place compression with the support for feature matrix slicing is that the speedup can vary depending on the choice of the unit slice size C. When the slice width is too large, there is a risk of too many slices occupying the extra cache lines. This would fetch a lot of invalid data together from the region, degrading the memory efficiency. On the other hand, when C is too small, the number of slices increases, which affects the amount of output feature accesses. Even though the number of extra cache line access is small, the execution time may be increased. Nonetheless, it is seen that the performance is not very sensitive to the slice size in the range of C=32 to C=256. The best performance overall is at C=96, but a poor choice may still provide a great amount of speedup over the baseline.

FIG. 16 shows how SGCN is scaled up with the varying number of engines and with different memory modules (HBM1 and HBM2) used. The computation can be distributed to multiple engines. When enough bandwidth is provided, increasing the number of engines provides an almost linear amount of speedup up to around eight engines, demonstrating good scalability. The scalability starts saturating at around 16 engines, which is where the system reaches near the maximum bandwidth of the memory module.

In FIG. 17, the geomean speedup of SGCN over various sparsity levels is plotted. The synthetic input activations of each layer with target sparsity were randomly generated. As displayed, SGCN shows better performance on almost all sparsity ranges. The dense format is better only on sparsity under 5%, because of the additional bitmap indices needed for BEICSR. The break-even point for CSR is at over 90% sparsity, which is the point where the size of the column indices in CSRs becomes smaller than the bitmap indices of BEICSR. As demonstrated in FIG. 17, SGCN is beneficial over a wide range of sparsity. The sparsity of activations is caused by the wide use of ReLU functions. With normalized values, the after-ReLU distribution will have a near-zero mean, leading to around 50% sparsity. Therefore, even when GCNs evolve to have distinct characteristics, the sparsity level is unlikely to change towards the extreme levels. However, when the input features of the first layer take a one-hot vector format, sparsity can be extremely high as in NELL. In this case, using CSR format for input features may be better, and SGCN may perform combination using the aggregation engine designed to handle CSR formats.

As a result, as the GCN develops into a deep residual layer, the apparatus for accelerating neural networks according to the present disclosure may optimize memory traffic by using intermediate feature sparsity, which could not be used for the existing shallow GCN. To exploit feature sparsity, the BEICSR, a sparse feature representation format, is presented, and the sparsity-aware cooperation that can better handle locality when changes in access patterns result in various sparsity levels is proposed. The experimental results show that the apparatus according to the present disclosure can achieve superior performance and energy efficiency compared to conventional state-of-the-art GCN accelerators.

The present disclosure has been described above with reference to its desired embodiments, but a person having ordinary skill in the art would understand that the present disclosure can be modified and varied within the technology and the scope of the present disclosure as set forth in the claims below.

What is claimed is:

1. An apparatus for accelerating neural networks, comprising:
   a memory for storing graph input data including vertices and edges;
   an aggregation engine that performs an aggregation phase by processing an accumulation of features and generating feature vectors by taking the graph input data and performing an aggregation operation on the graph input data;
   an on-chip cache for caching the feature vectors; and
   a combination engine that performs a combination phase by generating a systolic array for matrix multiplications based on the feature vectors taken from the on-chip cache and weights taken from the memory,
   wherein the combination engine performs a rectified linear unit (ReLU) operation on the systolic array and compresses a result of the ReLU operation, and
   wherein the combination engine performs a bitmap-index embedded in-place CSR (BEICSR) format compression based on whether the result of the ReLU operation is zero or non-zero.

2. The apparatus of claim 1, wherein the aggregation engine is formed to have a plurality of processors each having a single instruction multiple data (SIMD) core structure.

3. The apparatus of claim 1, wherein the aggregation engine includes:
   a graph reader for taking the graph input data and extracting the vertices and the edges from the graph input data;
   a feature reader for generating feature vectors for the edges; and
   a sparse aggregator for receiving the vertices and the edges from the graph reader and receiving the feature vectors from the feature reader to perform the aggregation operation.

4. The apparatus of claim 3, wherein, when the aggregation phase is performed first among the aggregation phase and the combination phase, the sparse aggregator carries out the accumulation of the features by performing a feature accumulation operation between adjacency matrices for adjacent vertices of the graph input data and the feature vectors for the vertices and the edges and calculates weights by the combination engine.

5. The apparatus of claim 3, wherein, when the combination phase is performed first among the aggregation phase and the combination phase, the sparse aggregator calculates adjacency matrices for adjacent vertices of the graph input data after performing an operation between the accumulation of the features and the weights by the combination engine.

6. The apparatus of claim 1, wherein the on-chip cache operates as a buffer for exchanging data between the aggregation engine, the combination engine, and the memory.

7. The apparatus of claim 1, wherein the combination engine compresses data row by row in the performing of the BEICSR format compression and stores each row in a same reserved place in the memory.

8. The apparatus of claim 7, wherein the combination engine partitions a bit vector for an entire row and embeds it in a head of a corresponding unit slice, and aligns slices to burst boundaries and performs the BEICSR format compression for each slice to allocate a memory space for holding slices densely.

9. The apparatus of claim 1, wherein the combination engine updates the memory by storing the result of the BEICSR format compression in the on-chip cache.

10. An apparatus for accelerating neural networks, comprising:
    a memory for storing graph input data including vertices and edges;
    an aggregation engine that processes an accumulation of features and generates feature vectors by taking the graph input data and performing an aggregation operation on the graph input data; and
    a combination engine that generates a systolic array for matrix multiplications based on the feature vectors and weights taken from the memory,
    wherein the combination engine performs a rectified linear unit (ReLU) operation on the systolic array and carries out a bitmap-index embedded in-place CSR (BEICSR) format compression based on a result of the ReLU operation.

11. The apparatus of claim 10, wherein the aggregation engine performs the aggregation operation by taking the graph input data, extracting vertices and edges from the graph input data, and generating feature vectors for the edges.

* * * * *